(12) United States Patent
Metzler et al.

(10) Patent No.: US 10,792,755 B2
(45) Date of Patent: Oct. 6, 2020

(54) METHOD FOR MANUFACTURING A COMPONENT STRUCTURE

(71) Applicant: Rolls-Royce Deutschland Ltd & Co KG, Blankenfelde-Mahlow (DE)

(72) Inventors: Dirk Metzler, Hanau (DE); Stefan Longerich, Oberursel (DE)

(73) Assignee: ROLLS-ROYCE DEUTSCHLAND LTD & CO KG, Blankenfelde-Mahlow (DE)

( * ) Notice: Subject to any disclaimer, the term of this patent is extended or adjusted under 35 U.S.C. 154(b) by 288 days.

(21) Appl. No.: 15/925,359

(22) Filed: Mar. 19, 2018

(65) Prior Publication Data
US 2018/0264583 A1   Sep. 20, 2018

(30) Foreign Application Priority Data

Mar. 20, 2017  (DE) .................. 10 2017 105 967

(51) Int. Cl.
*B23K 26/00*  (2014.01)
*B23K 15/00*  (2006.01)
(Continued)

(52) U.S. Cl.
CPC ........ *B23K 15/006* (2013.01); *B23K 15/0006* (2013.01); *B23K 15/0053* (2013.01);
(Continued)

(58) Field of Classification Search
CPC ............ B23K 15/0006; B23K 15/0053; B23K 15/006; B23K 26/26; B23K 26/28; B23K 26/50; B23K 31/125
(Continued)

(56) References Cited

U.S. PATENT DOCUMENTS

| 2,987,610 A | 6/1961 | Steigerwald |
| 3,588,463 A * | 6/1971 | Best ................... B23K 15/0013 |
| | | 219/121.13 |

(Continued)

FOREIGN PATENT DOCUMENTS

| DE | 1087295 B | 8/1960 |
| DE | 2101413 A1 | 8/1972 |

(Continued)

OTHER PUBLICATIONS

German Search Report dated Jun. 2, 2017 for counterpart German Patent Application No. DE 10 2017 105 967.9.

*Primary Examiner* — Sang Y Paik
(74) *Attorney, Agent, or Firm* — Shuttleworth & Ingersoll, PC; Timothy J. Klima

(57) ABSTRACT

A method for producing a component structure of two components includes subjecting the components to beam energy for melting in a contact region. A variation of beam current is set to melt the components in the contact region over a defined component depth less than the perpendicular distance between sides of the contact region. A defined beam current pulse is periodically imparted to the variation of the beam current, to melt the components at least approximately over the entire perpendicular distance between the sides of the contact region and to produce in the region of the second side weld regions of a weld root of the weld connecting the components projecting from the contact region and form a pattern which representative of a weld quality. Between the weld regions there is no melting of the components in the region between the defined component depth and the second side.

14 Claims, 5 Drawing Sheets

(51) Int. Cl.
 *B23K 31/12* (2006.01)
 *B23K 26/28* (2014.01)
 *B23K 26/50* (2014.01)
 *B23K 26/26* (2014.01)

(52) U.S. Cl.
 CPC .............. *B23K 26/26* (2013.01); *B23K 26/28* (2013.01); *B23K 26/50* (2015.10); *B23K 31/125* (2013.01)

(58) Field of Classification Search
 USPC .... 219/101, 102, 121.1–121.14, 136, 137 R, 219/121.6–121.65
 See application file for complete search history.

(56) References Cited

U.S. PATENT DOCUMENTS

| | | | |
|---|---|---|---|
| 4,229,639 | A | 10/1980 | Koy et al. |
| 2004/0050906 | A1* | 3/2004 | Rice .................... B23K 20/1235 228/112.1 |
| 2005/0179970 | A1* | 8/2005 | D' Angelo ........... B23K 26/032 359/32 |
| 2012/0234805 | A1* | 9/2012 | Schwarz ................ B23K 26/03 219/121.63 |
| 2013/0135460 | A1* | 5/2013 | Syassen .................... G01L 1/00 348/129 |
| 2014/0003860 | A1* | 1/2014 | Evangelista ........... B23K 9/235 403/270 |

FOREIGN PATENT DOCUMENTS

| | | |
|---|---|---|
| DE | 22010014 A1 | 9/1973 |
| DE | 2637371 A1 | 2/1978 |

* cited by examiner

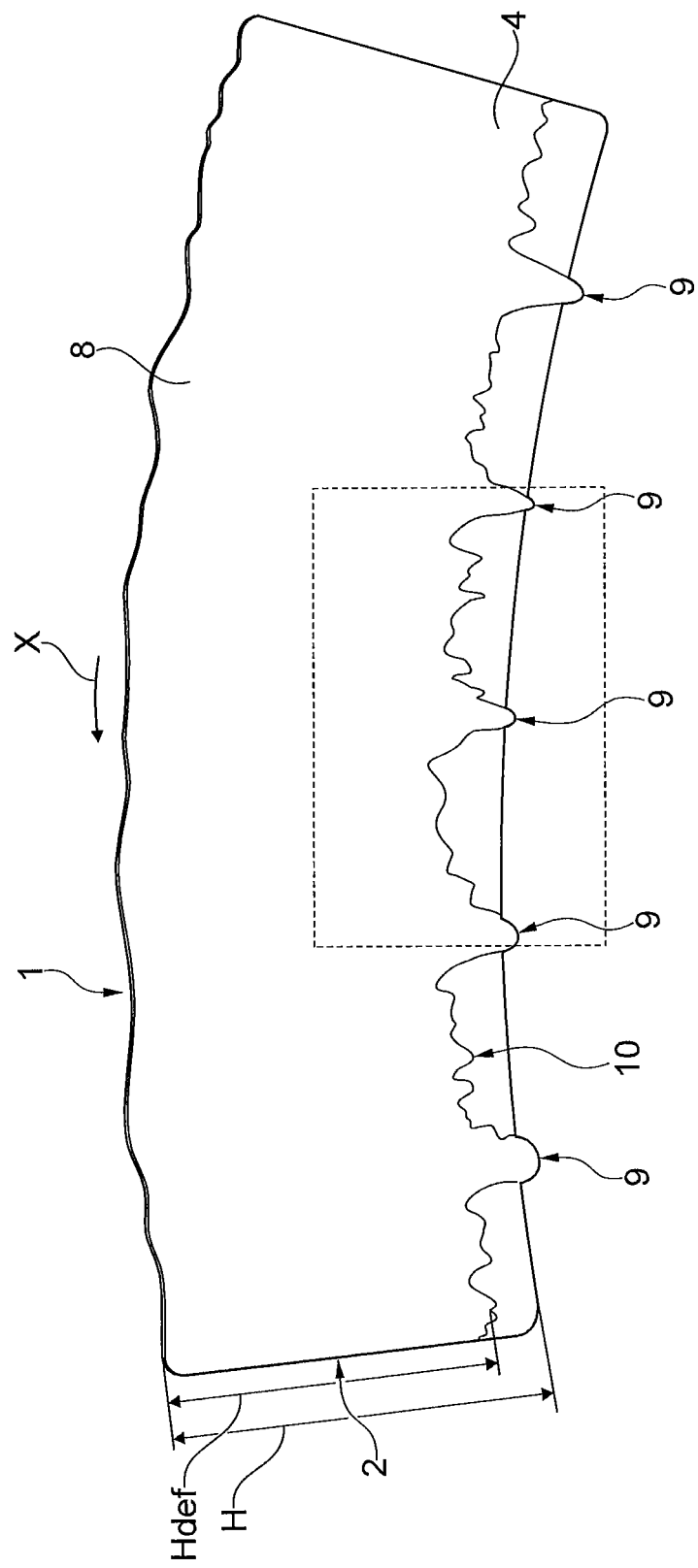

METHOD FOR MANUFACTURING A COMPONENT STRUCTURE

This application claims priority to German Patent Application DE102017105967.9 filed Mar. 20, 2017, the entirety of which is incorporated by reference herein.

The invention relates to a method for producing a component structure of a type defined more specifically herein.

In applications in which high mechanical-technological requirements have to be met for reasons of structural design and/or because of the materials used, the electron beam welding process or laser beam welding process is often used for producing the welded connection. Because of special design requirements or the properties of the materials to be welded, it may be required here that it is not possible for the weld joint to be welded through, with the formation of an underbead. This is brought about by very low welding speeds or a very low viscosity of the melt, whereby the material that is melted during the beam welding process has a tendency to sag as it were under the force of gravity and to flow out or drip off from the contact region of the components to be welded to one another, whereby a weld quality is adversely affected to a not inconsiderable extent.

To be able to ensure the particular interior configuration, i.e. the welding-in depth, of the weld produced, it is nevertheless required to produce a visual feature, since nondestructive material testing is often insufficient for ascertaining anything with certainty. Chosen for this are welding parameters that allow a continuous threading through as it were of the beam during the entire welding process, i.e. a sustained complete penetration of the joint at a specific point. However, beam welding processes are generally highly dynamic processes and the depth of penetration of the beam changes considerably within short operating times during the welding process. One reason for this is that interactions that have a considerable influence on a stable state of the welding process within a short time occur in the region of the phase boundary between material that is melted by the welding beam and in the liquid state of aggregation and material in the vaporous state of aggregation in the contact region between the components to be welded.

To avoid sagging of the weld material and at the same time monitor the welding-in depth achieved, the beam current is varied during the beam welding process by an operator using a potentiometer. By an operator controlling the beam current, it is attempted to connect the components that are to be interconnected manually to one another by means of a continuous through-welding with as high a weld quality as possible. The operator thereby attempts to set the beam current in each case to such a level that the threading through is evident on the side of the contact region of the components to be welded to one another that is facing away from the energy input, in order to be easily able to carry out a visual inspection of the weld quality during and after completion of the welding process.

High weld qualities can only be achieved to a certain extent by manual control of the beam current by an operator, since the rapidly changing process states of the welding process are not always countered by the manual control of the beam current by the operator within the required response time to an extent that ensures a high weld quality.

Moreover, the quality of the weld produced by the beam welding process, in particular the welding-in depth achieved, cannot at present be determined by nondestructive testing methods, such as ultrasound or x-ray, if no visual feature is available. Furthermore, even if insufficient weld quality is established, re-welding that increases the weld quality is not possible in the region of the weld between the components to be connected to one another that is produced by way of the beam welding process, either from the side of the contact region that is facing the energy input or from the side of the contact region that is facing away, because of the impermissible material loss caused by the sagging, in particular in the case of small component geometries. Because of the requirements in terms of the structural design and technical aspects of the material, welding of the cap pass (i.e. on the root side of the weld) is generally not possible.

The present invention is therefore based on the object of providing a method for producing a component structure of at least two components to be welded to one another by means of beam welding in certain regions, at least in a contact region, by means of which a high weld quality can be easily produced and can also checked with little effort.

This object is achieved according to a method with features as disclosed herein.

In the case of the method according to the invention for producing a component structure of at least two components to be welded to one another in certain regions, at least in a contact region, by means of beam welding, by defined setting of a beam current the components are subjected to beam energy from a first side of the contact region of the components that is facing the energy input in the direction of an opposite second side of the contact region, and are melted at least in certain regions in the contact region. For this, a variation of the beam current is set such that the components are melted in the contact region, from the first side in the direction of the second side, over a defined component depth that is less than the perpendicular distance between the sides, in order to avoid sagging of melted material in the region of the contact region.

According to the invention, a defined beam current pulse is periodically imparted to the variation of the beam current, in order to melt the components in certain regions at least approximately over the entire perpendicular distance between the sides of the contact region and to produce in the region of the second side weld regions of a weld root of the weld connecting the components that project out of the contact region and form a pattern which is representative of a weld quality, while between the weld regions there is no melting of the components in the region between the defined component depth and the second side.

By means of the procedure according to the invention, the at least two components to be welded to one another in certain regions at least in a contact region are subjected to a defined energy input during the entire welding process by setting a defined variation by setting a basic level of the beam current, in order to produce a weld having a defined welding depth between the two components in the contact region. In this case, the production of a definite underbead of the weld and a continuous or sustained threading through, as in the case of the manually set process, are avoided with little effort and the risk of welding material sagging out of the contact region between the components is reduced to the desired extent. This results from the fact that the threading through that is generated only in certain portions according to the invention as a result of the current beam pulses has the effect that unwanted melting of the components between the weld regions takes place to a defined extent from the first side to a defined component depth and beyond that ceases to the desired extent.

To be able also to easily check the weld quality or the quality of the welding process after completion of the welding process, the defined beam current pulses are periodically imparted to the variation of the beam current. The imparted beam current pulses each have the effect of temporarily melting the components over the entire extent of the contact region in the direction of the beam and produce on the side of the contact region that is facing away from the energy input weld regions of the weld root of the weld connecting the components. The weld regions reach beyond the contact region on the second side or project out of the contact region on the second side and form a pattern which is representative of the weld quality.

In this respect, the procedure according to the invention is based on the recognition that weld regions that follow one another regularly in the direction of advancement of the components during the beam welding process and are formed in approximately the same size correspond to a desired good weld result, and the welding-in depth of the weld has the value required for a high weld quality between the additionally produced weld regions. Conversely, this means for example that absent weld regions in the region of the second side of the contact region indicate an inadequate welding-in depth, and consequently an unsatisfactory welding result.

In this way, the checking and detecting of the weld quality can be easily carried out without material-destructive test methods. The weld regions that can be produced by the procedure according to the invention can be easily evaluated both by personnel and by means of an automated testing process to establish the welding quality of the beam welding process carried out.

After the checking of the weld quality, the weld regions can be removed with little effort by means of mechanical reworking steps, whereby the component structure can be produced with the desired strength in a low-cost way.

If the unpulsed variation of the beam current is predetermined in dependence on the perpendicular distance between the sides of the contact region and the variation is raised as the distance increases, the welding-in depth is easily adaptable to the component geometry of the components to be welded to one another or of the contact region.

In the case of a variant of the method according to the invention, the energy that is additionally input temporarily in each case into the components by the beam current pulses is set in a controlled manner in dependence on the electrons that completely penetrate the components, in order to be able to minimize the energy that has to be made available for producing the weld regions and provided for generating the beam current pulses.

If a sensor system for determining the number of electrons that completely penetrate the components and the result of which is output to an evaluation unit is arranged on the second side, the energy that is respectively input into the components can be easily recorded and can be brought in the direction of a predefined setpoint value within short operating times.

In the case of a variant of the method according to the invention that can be carried out with little control expenditure, the current intensity of the beam current is increased by a defined constant offset value for a defined operating time during the imparting of a beam current pulse to the variation of the beam current, starting from the value at the time of the unpulsed beam current.

As an alternative to this, the beam current pulse imparted to the unpulsed variation of the beam current is produced by periodically generating a number of defined individual beam current pulses over a defined operating time, in order to be able to produce the weld regions to the desired extent.

The procedure according to the invention is easily based on a validatable production process if the course of the unpulsed beam current variation is empirically determined in a reference process.

If the current intensity of the beam current pulses is chosen in dependence on the materials to be melted of the components in the contact region in such a way that the weld regions on the side that is facing away from the energy input do not exceed a predefined amount, sagging of the welding material is easily avoided.

In the case of further advantageous variants of the method according to the invention, the components are welded to one another by means of electron beam welding and/or laser beam welding in each case in a vacuum or atmosphere, preferably in dependence on the component geometries to be welded to one another in each case and the materials used for the production of the components.

If the assessment of the weld quality takes place in an automated manner on the basis of the determined pattern of the weld regions and comparative data stored for this in a memory unit, the component structure can be produced substantially independently of an operator.

The method according to the invention can be implemented particularly easily in existing welding installations and can be carried out with the desired high degree of exactitude by means of a computer program, which comprises computer-executable program coding instructions for implementing the method according to the invention described more precisely above and which is run on a computer.

The invention also comprises a computer program product, in particular a nonvolatile computer-readable data storage medium, which comprises the computer-executable computer program.

By means of the component structure according to the invention, with at least two components welded to one another in certain regions in a contact region by means of beam welding, in which the components have on a side of the contact region that is facing away from the energy input during the beam welding weld regions of a weld root that project out of the contact region and form a pattern, and the pattern is representative of a weld quality, the weld quality can be easily determined with little effort without material-destructive test methods.

In the case of an embodiment of the component structure according to the invention that is characterized by a high welding quality, the weld regions are spaced apart from one another to a defined extent in the welding direction and are of substantially the same size, the weld root between the weld regions lying between a side that is facing the energy input and the side of the contact region that is facing away from the energy input.

Both the features specified in the patent claims and the features specified in the subsequent exemplary embodiment of the subject matter according to the invention are in each case suitable by themselves alone or in any desired combination with one another for developing the subject matter according to the invention.

Further advantages and advantageous developments of the invention emerge from the patent claims and the exemplary embodiment that is described in principle with reference to the drawing:

in which:

FIG. 6 shows a further sectional view of the component structure according to FIG. 1e along a sectional plane running in the direction of the weld.

Figure 1A:
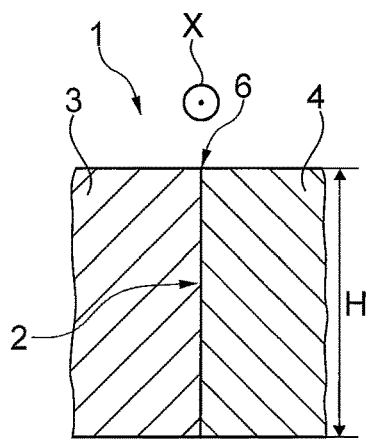
FIG. 1a to FIG. 1e show in each case a schematized partial sectional view of a component structure of at least two components to be welded to one another in a contact region by means of beam welding during various phases of the beam welding process.

FIG. 1a to FIG. 1e show in each case a sectional view of a component structure 1 with two components 3, 4 to be connected to one another in a contact region 2 by means of an electron beam welding process. In this present case, the component 3 is a shaft collar, which is produced for example from a steel material and is to be connected to the component 4, which is configured for example as a turbine disc wheel of a jet engine and consists for example of a high temperature resistant nickel-based alloy. During the beam welding process, the components 3, 4 are moved in the direction of advancement X with respect to an electron beam 5, in order to be able to present a continuous welding process. By defined setting of the beam current, the components 3 and 4 are subjected during the beam welding process to beam energy from a first side 6 of the contact region 2 of the components 3, 4 that is facing the energy input in the direction of an opposite second side 7 of the contact region 2, and is increasingly melted in the contact region 2 as the operating time increases. In this respect, FIG. 1a to FIG. 1e show successive operating states of the component structure 1 before, during and after the welding process.

Figure 1B:
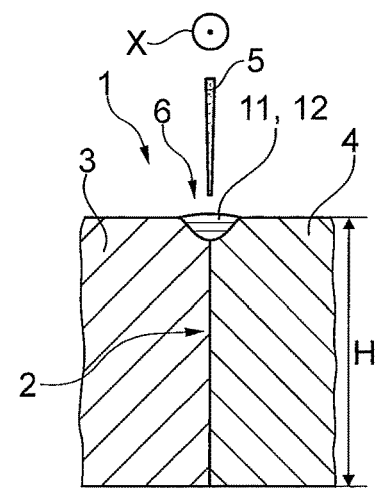
Figure 1C:
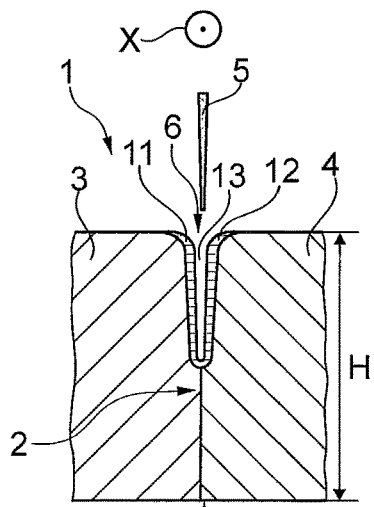
Figure 1D:
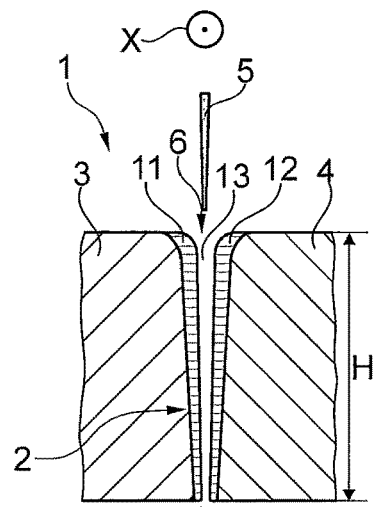

In FIG. 1a, and unwelded and not melted operating state of the components 3, 4 is represented. As a difference from this, the components 3, 4 in the operating state that is shown in FIG. 1b are melted in certain regions by the beam-side energy input in a region that is facing the side 6. With increasing energy input into the components 3, 4 during the beam welding process, the melted region of the components 3, 4 increases from the side 6 in the direction of the second side 7 of the contact region 2, as shown more specifically in FIG. 1c and FIG. 1d, until the contact region 2 is melted over the entire height H. In this case, not only is the material of the components 3, 4 liquefied but in addition to liquid material in the contact region 2 there also forms between liquid material regions 11, 12 a so-called vapour cavity 13, in which vaporous material of the components 3, 4 is arranged.

Figure 1E:
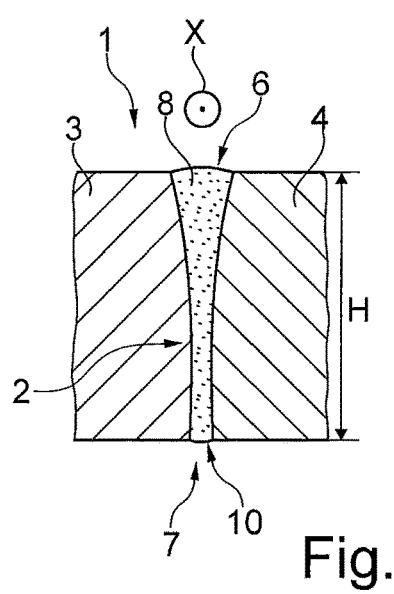

In addition, FIG. 1e shows the weld 8 that has been produced by beam welding and solidified, by way of which the components 3 and 4 are connected to one another to the desired extent. The production of the weld 8 over the entire height H takes place within a few milliseconds. In this case, the welding is carried out by means of electron beam welding, preferably in a vacuum, in order to avoid undesired interactions between the components 3 and 4 and the oxygen-containing surroundings. During the beam welding process, the beam current is set to a such a level that the components 3 and 4 are welded or connected to one another by way of a weld 8 extending over the entire perpendicular distance H between the sides 6 and 7.

However, in particular in the case of the present combination of materials to be welded, this cannot be readily put into practice, since beam welding processes are generally highly dynamic joining processes and sagging of welding material out of the contact region 2 has to be avoided to achieve a high welding quality.

Figure 2:
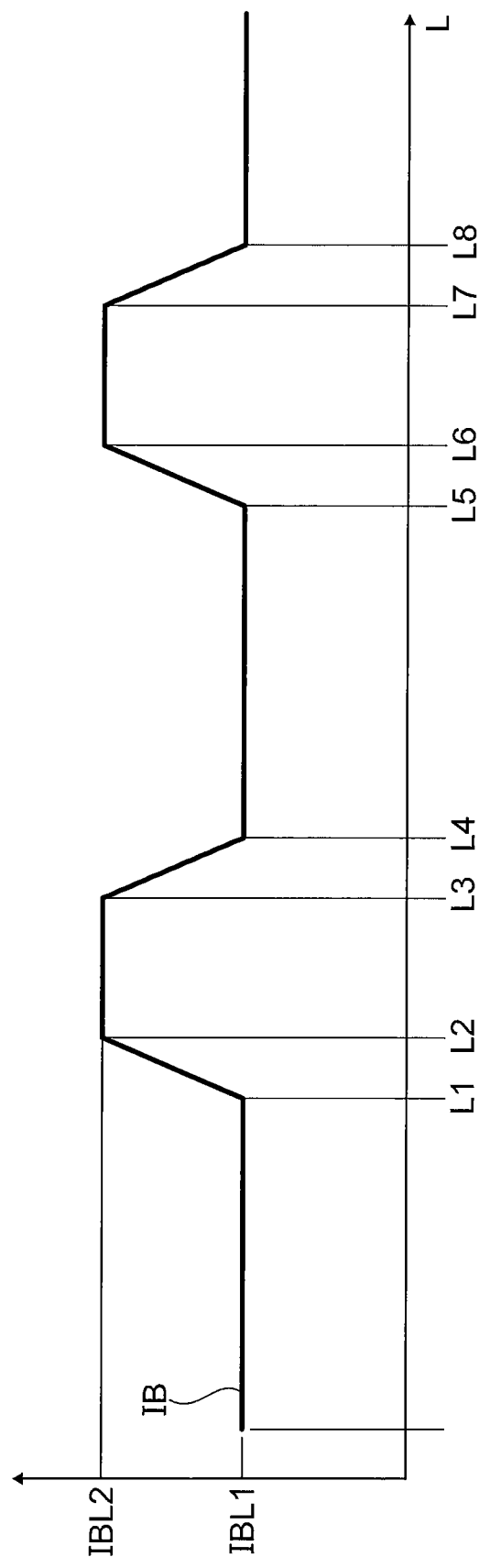
FIG. 2 shows a schematic variation of the beam current over the advancement path.
Figure 3:
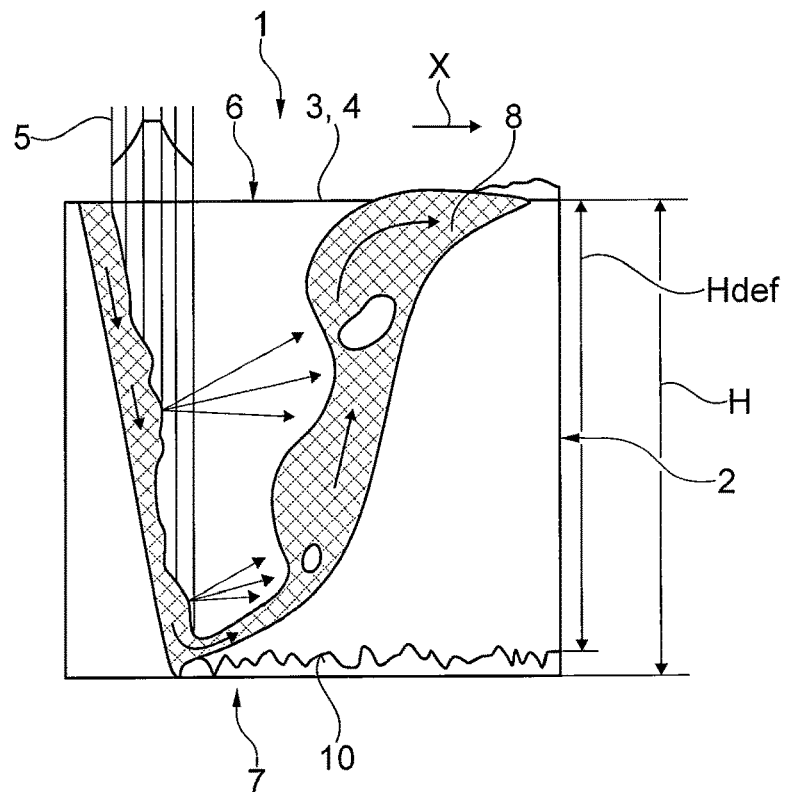
FIG. 3 shows a further partial sectional view of the component structure in the region of the weld to be produced by means of the beam welding process, the weld root of which lies within the contact region.

For this reason, the variation of the beam current IB is set for a time to the extent shown in FIG. 2 in such a way that, in the contact region 2, the components 3 and 4 are only melted from the first side 6 in the direction of the second side 7 to the extent represented in turn in FIG. 3 over a defined component height Hdef, which is less than the perpendicular distance H between the sides 6 and 7.

Figure 4:
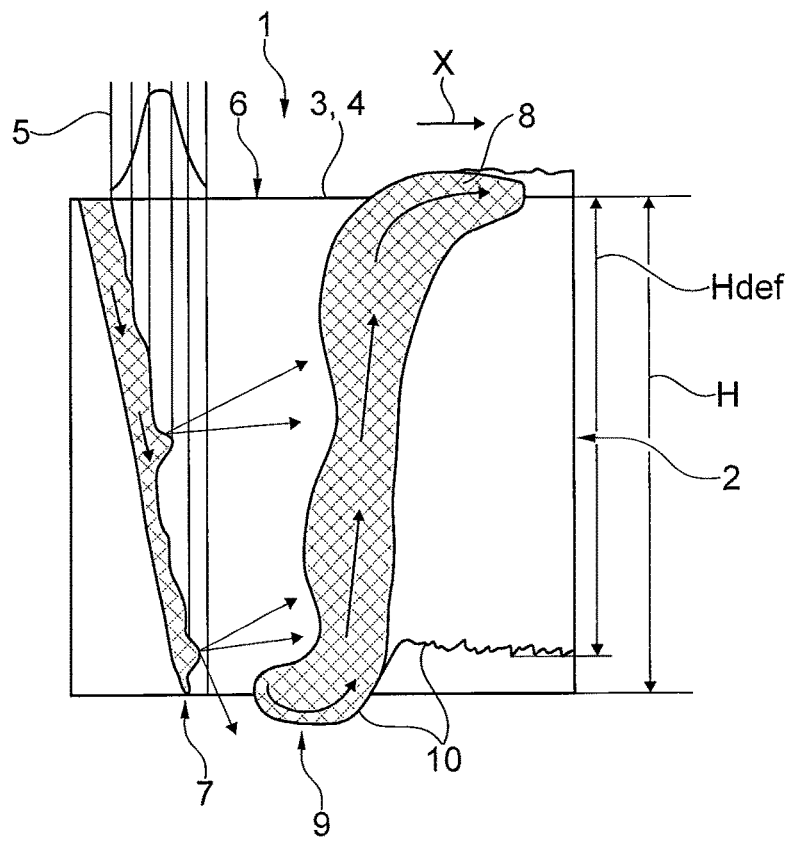
FIG. 4 shows a representation corresponding to FIG. 3 with a weld region of the weld root of the weld connecting the components that projects out of the contact region.

Since in the case of the so-called welding-in that is represented in a schematized form in FIG. 3, in which the weld root 10 of the weld 8 is arranged within the contact region and running between the sides 6 and 7, the weld quality is not verifiable by means of test methods that do not destroy the material, and neither material-destructive testing of the weld quality of the weld 8 is possible nor can reworking of the weld 8 be carried out from the second side 7, in particular in the case of unfavourable or small component geometries of the components 3 and 4, an additional beam current pulse is imparted to the variation of the beam current IB in the way represented in FIG. 2 as from a defined advancement path value L1 over a defined advancement path, and consequently over a defined operating time in the millisecond range. By means of this beam current pulse, the components 3 and 4 are temporarily melted to the extent shown in FIG. 4 over the entire perpendicular distance H between the sides 6 and 7 of the contact region 2, and weld regions 9 of the weld root 10 of the weld 8 connecting the components 3 and 4 that in each case project out of the contact region 2 are produced and form a pattern which is representative of the weld quality in the way explained more precisely later.

For this, in the present case the variation of the beam current IB is set as substantially constant up to the discrete advancement path value L1 and, on reaching the advancement path value L1, is raised from a current value IBL1 to the extent represented in FIG. 2 in a ramp-like manner to the reaching of a further advancement path value L2 up to a consequently corresponding current value IBL2, and up to an advancement path value L3 of the components 3 and 4 is left constantly at the current value IBL2.

As the advancement path L increases further, as from the advancement path value L3 the variation of the current value IB is lowered in turn in a ramp-like form in the direction of the first current value IBL1, and subsequently, as from the advancement path value L4, is again set constantly to this value. As from reaching a further discrete advancement path value L5, a further current beam pulse is in turn imparted to the variation of the current value IB, in order to produce a further weld region 9 projecting out of the contact region 2. In this case, the variation of the beam current IB at the discrete advancement path values L5 to L8 is set to the extent described in relation to the discrete advancement path values L1 to L4.

Figure 5:
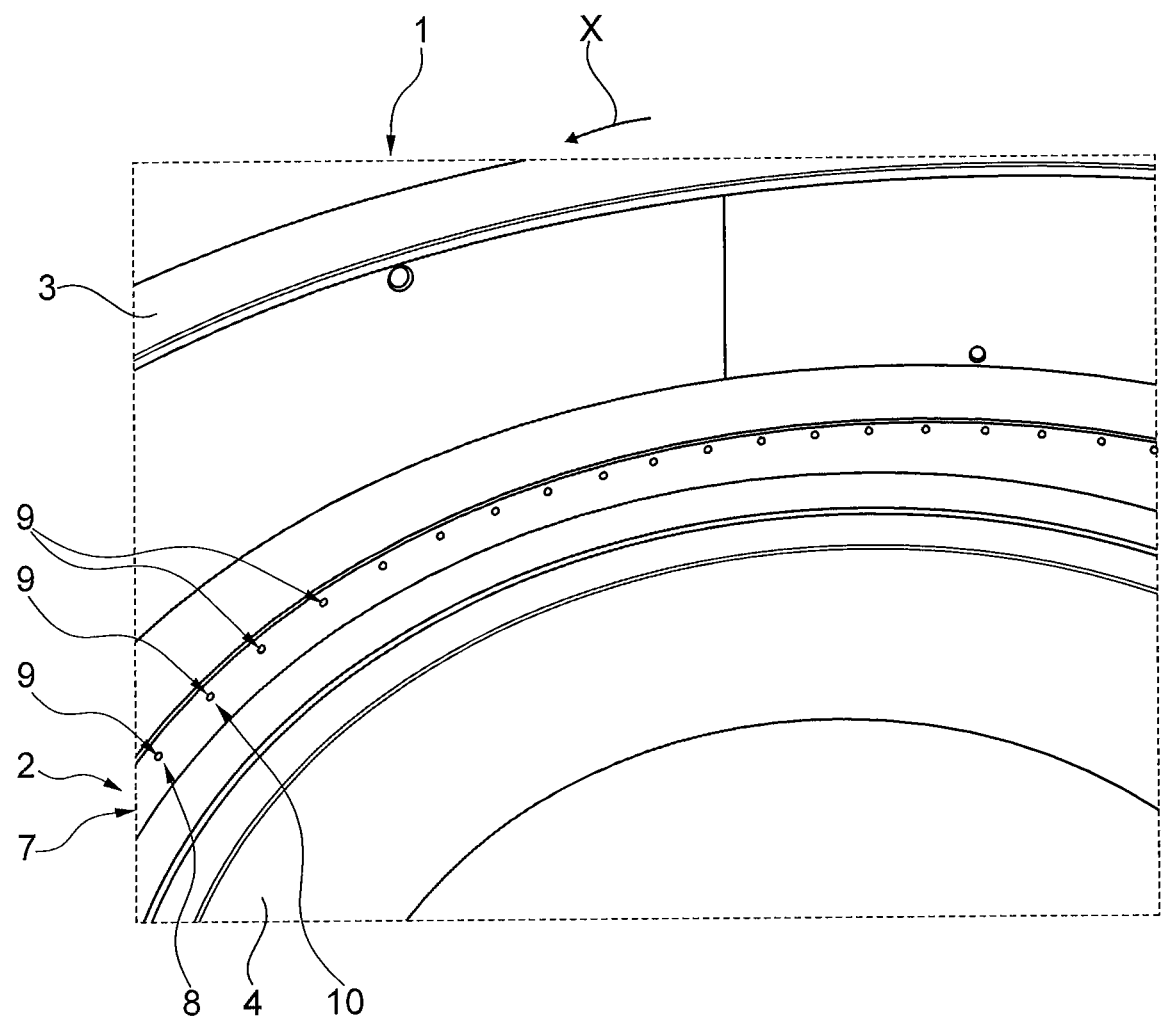
FIG. 5 shows a three-dimensional view of the component structure with a number of weld regions arranged on the side that is facing away from the energy input.

The last-described procedure brings about a pattern of the weld regions 9 that is shown more specifically in the region of the side 7 of the contact region 2 of the components 3 and 4 and in FIG. 5 and is formed by a multiplicity of weld regions 9 arranged evenly distributed over the circumference of the in the present case rotationally symmetrical configured components 3 and 4. In this case, the weld regions 9 are of substantially the same size and are spaced apart from one another approximately equally in the circumferential direction X.

In FIG. 6, a partial sectional view of the component structure 1 shown in FIG. 5 is shown along the course of the weld 8. It is evident from the representation according to FIG. 6 that the weld root 10 between the weld regions 9 on average lies in each case at a defined distance from the lower side within the contact region 2, and the welding between the components 3 and 4 has a welding-in depth from the first side 6 of the contact region 2 that ensures a desired high weld quality.

In the case of the beam welding process considered in the present case, the high voltage that is partly responsible for generating the electron beam is set as constant. In this case, an increase of the high voltage or the acceleration voltage brings about the effect that the electron energy increases and a stiffening of the electron beam is achieved.

The working vacuum that is present during the electron beam welding is likewise set to be as constant as possible, in order to achieve a low scattering of the electrons, and consequently to achieve a setting of the beam focus that is as sharp as possible. In addition, the working distance between the beam outlet of the welding installation and the first side 6 of the contact region 2 is predetermined in dependence on the high voltage that is set, and taking into consideration the fact that particularly sharp focusing of the electron beam becomes more difficult as the working distance increases.

In addition, the lens current of a magnetic lens is kept as constant as possible during the beam welding process, in order to be able to predetermine the electron beam welding with a defined focal length, and consequently with a defined position of the focal plane in relation to the component surface 6. Furthermore, the electron beam is moved with a small amplitude and average frequency, in order to be able to shape the melt bath, and consequently the weld profile, to the desired extent by way of a defined beam oscillation.

Since the welding speed on the one hand influences the productivity and on the other hand also has a significant influence on the welding metallurgy and the solidifying process of the melt of the components 3 and 4, the welding speed is in the present case likewise kept as constant as possible, in order to be able to operate the beam welding process with little control expenditure.

LIST OF DESTINATIONS

1 Component structure
2 Contact region
3, 4 Component
5 Electron beam
6 First side of the contact region
7 Second side of the contact region
8 Weld
9 Weld region
10 Weld root
11, 12 Liquid material region
13 Vapor cavity
H Perpendicular distance
Hdef Defined component depth
IB Beam current
IBL1, IBL2 Discrete value of the beam current
L Advancement path
L1 bis L8 Discrete advancement value
X Direction of advancement

The invention claimed is:

1. A method for producing a component structure of at least two components to be welded to one another in a contact region by beam welding, comprising:
  subjecting the at least two components to beam energy from a first side of the contact region that faces the beam energy toward an opposite second side of the contact region to form a weld between the at least two components,
  setting a variation of a beam current such that the at least two components are melted in the contact region, from the first side in a direction of the second side, over a defined component depth that is less than a perpendicular distance between the first and second sides to form a weld root of the weld,
  periodically imparting a defined beam current pulse to the variation of the beam current, in order to melt the at least two components in certain regions over an entirety of the perpendicular distance to produce in the certain regions of the second side, spaced apart weld regions that extend beyond the weld root toward the second side to project out of the contact region and form a pattern that is visible from the second side, the pattern being a non-destructive representative of a weld quality, while between the spaced apart weld regions, there is no melting of the at least two components in a region between the defined component depth and the second side and there is a different visual appearance from the second side as compared to the spaced apart weld regions.

2. The method according to claim 1, and further comprising predetermining the variation of the beam current in dependence on the perpendicular distance and increasing the variation of the beam current being as the perpendicular distance increases.

3. The method according to claim 1, and further comprising setting an energy that is additionally input into the at least two components by the periodic defined beam current pulses in a controlled manner in dependence on electrons that completely penetrate the at least two components.

4. The method according to claim 3, and further comprising providing a sensor system for determining the electrons that completely penetrate the at least two components and outputting a result of the determining to an evaluation unit arranged on the second side.

5. The method according to claim 1, and further comprising increasing a current intensity of the beam current by a defined constant offset value for a defined operating time during the imparting of the defined beam current pulse, starting from a value at a time of the variation of the beam current.

6. The method according to claim 1, and further comprising producing the defined beam current pulse by periodically generating a number of defined individual beam current pulses over a defined operating time.

7. The method according to claim 1, and further comprising empirically determining a course of the variation of the beam current in a reference process.

8. The method according to claim 1, and further comprising choosing a current intensity of the defined beam current pulses in dependence on materials to be melted of the at least two components in the contact region such that the weld regions facing away from the beam energy do not exceed a predefined amount.

9. The method according to claim 1, and further comprising welding the at least two components to one another by at least one chosen from a group including electron beam welding and laser beam welding.

10. The method according to claim 1, and further comprising assessing the weld quality in an automated manner based on the visual pattern of the weld regions and comparative data stored in a memory unit.

11. A computer program comprising:
computer-executable program coding instructions for implementing a method when the computer program is run on a computer:
the method comprising:
producing a component structure of at least two components to be welded to one another in a contact region by beam welding, comprising:
subjecting the at least two components to beam energy from a first side of the contact region that faces the beam energy toward an opposite second side of the contact region to form a weld between the at least two components,
setting a variation of a beam current such that the at least two components are melted in the contact region, from the first side in a direction of the second side, over a defined component depth that is less than a perpendicular distance between the first and second sides to form a weld root of the weld,
periodically imparting a defined beam current pulse to the variation of the beam current, in order to melt the at least two components in certain regions over an entirety of the perpendicular distance to produce in the certain regions of the second side, spaced apart weld regions that extend beyond the weld root toward the second side to project out of the contact region and form a pattern that is visible from the second side, the pattern being a non-destructive representative of a weld quality, while between the spaced apart weld regions, there is no melting of the at least two components in a region between the defined component depth and the second side and there is a different visual appearance from the second side as compared to the spaced apart weld regions.

12. A computer program product, comprising:
a nonvolatile computer-readable data storage medium,
the computer program according to claim 11.

13. A component structure comprising:
at least two components having a contact region between the at least two components;
a weld connecting the at least two components to one another in certain regions of the a contact region, the weld formed by beam welding;
the at least two components having a first side from which the beam welding was input and a second side facing away from the first side;
the weld including spaced apart weld regions of a weld root that extend beyond the weld root toward the second side to project out of the contact region and form a pattern that is visible from the second side, the pattern being a non-destructive representative of a weld quality, while between the spaced apart weld regions, there has been no melting of the at least two components in a region between the defined component depth and the second side and there is a different visual appearance from the second side as compared to the spaced apart weld regions.

14. The component structure according to claim 13, wherein the weld regions are spaced apart from one another to a defined extent in a welding direction and are of a same size, the weld root between the weld regions lying between the first side and the second side.

\* \* \* \* \*